United States Patent [19]
Shibata et al.

[11] Patent Number: 5,858,222
[45] Date of Patent: Jan. 12, 1999

[54] APPARATUS FOR AEROBIC BIOLOGICAL TREATMENT OF AQUEOUS ORGANIC WASTES

[75] Inventors: Masahide Shibata, Isehara; Tetsuro Fukase, Kamakura, both of Japan

[73] Assignee: Kurita Water Industries Ltd., Tokyo, Japan

[21] Appl. No.: 729,730

[22] Filed: Oct. 7, 1996

[51] Int. Cl.$^6$ .................................................. C02F 3/12
[52] U.S. Cl. ...................... 210/177; 210/145.1; 210/199; 210/201
[58] Field of Search .................. 210/625, 195.1, 210/199, 200, 201, 202, 205–208, 177, 192, 760, 252

[56] References Cited

U.S. PATENT DOCUMENTS

| | | | |
|---|---|---|---|
| 3,654,147 | 4/1972 | Levin et al. | 210/625 |
| 3,660,277 | 5/1972 | McWhirter et al. | 210/625 |
| 4,370,235 | 1/1983 | Suzuki et al. | 210/620 |
| 5,022,993 | 6/1991 | Williamson | 210/625 |

FOREIGN PATENT DOCUMENTS

| | | |
|---|---|---|
| 26 54 431 | 6/1978 | Germany . |
| 43 24 502 | 8/1994 | Germany . |
| 8-155482 | 6/1996 | Japan . |

*Primary Examiner*—Thomas S. Wyse
*Attorney, Agent, or Firm*—Flynn, Thiel, Boutell & Tanis, P.C.

[57] ABSTRACT

An apparatus for aerobic biological treatment of aqueous organic wastes, which enables the achievement of a reduction of the amount of excess sludge, a stable quality of the treated water and an improved sedimentation performance of the biosludge while reducing the area of installation site and construction investment using a smaller apparatus; which apparatus comprises a first aeration tank for mixing the aqueous organic waste with an activated sludge and aerating the resulting mixture; a solid/liquid separation unit; a modification unit for modifying a part of the separated sludge so as to render it easily biodegradable; and a second aeration tank for aerating the modified sludge and a return sludge and means for returning the sludge to said first aeration tank.

12 Claims, 3 Drawing Sheets

APPARATUS FOR AEROBIC BIOLOGICAL TREATMENT OF AQUEOUS ORGANIC WASTES

FIELD OF THE INVENTION

The present invention relates to an apparatus for aerobic biological treatment of aqueous organic wastes, in particular to an apparatus for aerobic biological treatment of aqueous organic wastes provided with a means for reducing the amount of excess sludge.

BACKGROUND OF THE INVENTION

In an aerobic biological treatment of aqueous organic wastes by making use of the activity of aerobic microorganisms, such as the so-called activated sludge treatment, a large amount of "excess sludge" is formed, which is difficult to be disposed of. While heretofore such excess sludge has been disposed by depositing it in landfills, because landfills are becoming less available, it is now necessary to reduce the amount of excess sludge formed.

Japanese Patent Kokai JP-A-6-206088 discloses a technique for aerobic biological treatment of aqueous organic wastes in which a greater amount of the biosludge than the amount of that multiplied by an anabolic intake of the BOD components in the waste is extracted from the aerobic biological treatment system and is subjected to an ozone treatment before it is returned to the biological treatment system, the apparatus for which is illustrated in FIG. 4 in a flow diagram. In FIG. 4, numeral 1 represents the aerobic biological treatment system composed of an aeration tank 11 and a solid/liquid separation unit 12 and 2 is a modification treatment system. Over the bottom of the aeration tank 11 is disposed an air distributor 15, to which an air supply line 16 is connected. To the aeration tank 11, an aqueous waste supply line 17 and a biosludge return line 24 having a pump 23 are joined. The aeration tank 11 communicates to the solid/liquid separation unit 12 via a connection line 18. To the solid/liquid separation unit 12, a treated liquid line 21 and a separated sludge delivery line 22 are joined. The separated sludge delivery line 22 branches off into a sludge return line 24, a sludge extraction line 32 and an excess sludge delivery line 37.

The modification treatment system 2 functions to modify the biosludge to convert it into an easily biodegradable product by the ozonization and is provided with an ozonization vessel 31 connected, at its upper portion, with a sludge extraction line 32 guided from the solid/liquid separation unit 12 and a spent ozone discharge line 33 and, at its lower portion, with an ozone supply line 34 and an ozonized sludge delivery line 35. The ozonized sludge delivery line 35 communicates to the aeration tank 11. A pump 36 is provided in the sludge extraction line 32.

For effecting the aerobic biotreatment of an aqueous organic waste using the apparatus as shown in FIG. 4, the aqueous organic waste to be treated is guided first into the aeration tank 11 via the aqueous waste supply line 17 and is mixed therein with the return sludge from the sludge return line 24 and with the biosludge present in the aeration tank 11, while introducing therein atmospheric air through the air distributor 15 to effect an aerobic biological treatment. A part of the mixed liquor in the aeration tank 11 is guided to the solid/liquid separation unit 12 via the connection line 18 and is subjected to a solid/liquid separation into a separated liquid and a separated sludge. The separated liquid is exhausted out of the system via the treated liquid line 21, while a part of the separated sludge is returned as the return sludge to the aeration tank 11 via the sludge return line 24 and the other part is supplied as an extracted sludge to the ozonization vessel 31. If excess sludge occurs, it is discharged out of the system via the excess sludge delivery line 37.

In the modification treatment system 2, a part of the separated sludge is guided into the ozonization vessel 31 via the sludge extraction line 32. Ozone is supplied through ozone supply line 34 to cause it to contact with the extracted biosludge to effect ozonization. The living bacteria in the extracted biosludge will almost be destroyed thereby and the biosludge is modified into easily biodegradable BOD components of the aqueous waste. The ozonized sludge is recirculated from the ozonized sludge delivery line 35 to the aeration tank 11, where it is subjected to aerobic biotreatment. By subjecting the extracted biosludge to an ozone treatment and then to the aerobic biotreatment in this way, a reduction in the amount of excess sludge can be attained and even a complete elimination of occurrence of excess sludge may be realized when a greater amount of extracted biosludge than the amount of the biosludge multiplied in the aerobic biotreatment system is subjected to the ozone treatment in the modification system.

In the above-described prior technique, however, the average sludge retention time (SRT) in the aerobic biotreatment system with respect to the living bacteria becomes lower due to the annihilation of the bacteria upon the ozone treatment, as shown by the equation:

$$\text{SRT of living bacteria} = A/B \qquad (a)$$

in which A denotes the amount of biosludge retained in the aeration tank and B represents the amount of ozonized biosludge.

If, for example, the amount of excess sludge occurred is zero, about three times the amount of excess sludge obtained in a conventional activated sludge treatment should be extracted and subjected to the ozone treatment, so that the SRT of living bacteria herefor (below, the SRT of living bacteria is denoted by SRT) will be decreased to $\frac{1}{3}$ of that in a conventional activated sludge treatment. Consequently, in the prior technique, insufficient biodegradation of organic matter may occur when the temperature of the aqueous waste is low, such as in winter, resulting in, for example, an instablility in the quality of the treated water and accumulation of undecomposed organic sludge in the flocs of biosludge which deteriorates the sedimenting property of the sludge in the aeration tank or in the solid/liquid separation tank.

Such problems may be avoided by installing further aeration units to reduce the load of the activated sludge, which, however, brings about increases in the installation site and construction investments accompanied by a greater economical restriction.

SUMMARY OF THE INVENTION

An object of the present invention is to provide an apparatus for aerobic biological treatment of aqueous organic wastes, which enables the achievement of a reduction of the amount of excess sludge and which can realize a stable quality of the treated water with an improved sedimentation performance of the biosludge. Also, reductions in the area of installation site and construction investment are realized by using a smaller apparatus.

The apparatus for realizing the biological treatment of aqueous organic wastes according to the present invention comprises;

a first aeration tank for mixing the aqueous organic waste with an activated sludge and aerating the resulting mixture;

a solid/liquid separation unit for subjecting the aerated aqueous suspension in said first aeration tank to a solid/liquid separation into a liquid phase and a separated sludge;

a modification treatment unit for modifying a part of the separated sludge delivered from said solid/liquid separation unit or a part of the aerated aqueous suspension in said first aeration tank so as to render it easily biodegradable;

a second aeration tank for mixing the modified sludge modified in said modification treatment unit with the other part of the separated sludge delivered from said solid/liquid separation unit and aerating the resulting mixture; and means for returning the mixture aerated in the second aeration tank to said first aeration tank.

DETAILED DESCRIPTION OF THE INVENTION

Figure 1:
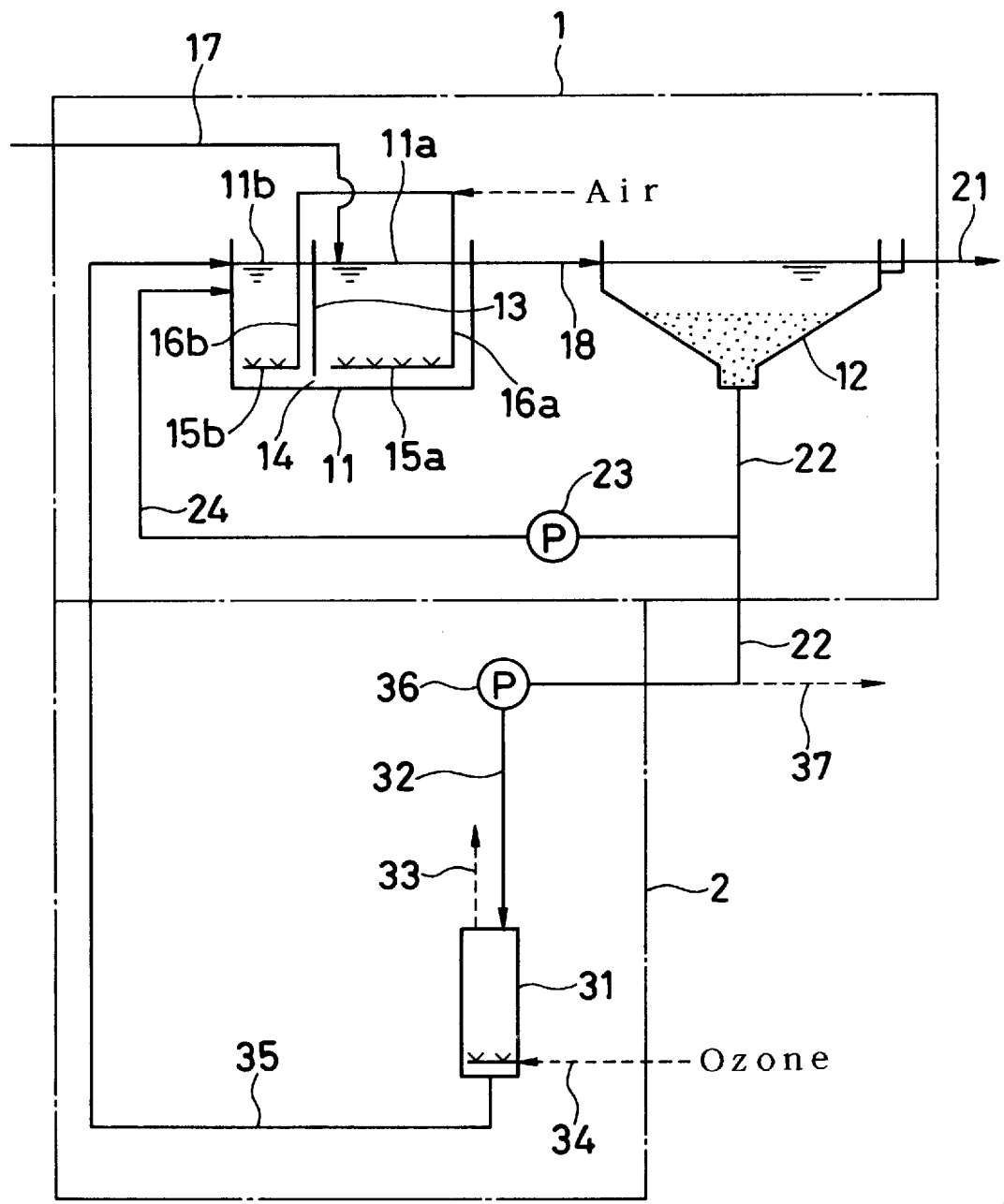
FIG. 1 is a schematic flow diagram for the apparatus of a preferred embodiment of the present invention.

The aqeous organic wastes to be treated according to the present invention include every aqueous liquid or slurry which contains organic substances capable of biodegradation by aerobic biological treatment and which also may contain also some other difficultly biodegradable organic substances and even inorganic substances. Examples of such aqueous organic wastes include sewage, human excrements, waste liquors from food and drink manufacturing factories and various industrial aqueous wastes.

The first aeration tank in the apparatus according to the present invention is designed for receiving an aqueous organic waste to be treated and the mixed liquor from the second aeration tank to mix them here together with the biosludge contained in the first aeration tank itself and for performing an aerobic biotreatment.

The solid/liquid separation unit in the apparatus according to the present invention is designed for subjecting the mixed liquor from the first aeration tank to a solid/liquid separation into a separated liquid and a separated sludge. For such a solid/liquid separation unit, those based on, for example, precipitation, floating, centrifugation, membrane filtration and so on, may be employed.

The modification treatment unit in the apparatus according to the present invention is designed for modifying the separated sludge from the solid/liquid separation unit or the biosludge in the mixed liquor of the first aeration tank (these are denoted hereinafter as the extracted biosludge) so as to convert it into an easily biodegradable product. For such a modifying unit, there may be employed, for example, an ozone treatment unit in which the extracted biosludge is modified by an ozone treatment, an acid treatment unit in which the extracted biosludge is modified by an acid treatment, an alkali treatment unit in which the extracted biosludge is modified by an alkali treatment, a heat treatment unit in which the extracted biosludge is modified by heating and a combination treating unit in which the extracted biosludge is modified by a combination of the above treatment units. Among them, the ozone treatment unit is preferred.

Among these modification units, the explanation is first directed to the ozone treatment unit. The ozone treatment unit as the modifying unit operates to bring the extracted biosludge into contact with ozone, wherein the biosludge is modified so as to convert it into an easily biodegradable product by the oxidative action of ozone. As the ozone treatment unit, every unit having an ozonization vessel for realizing the contact of the biosludge with ozone to effect an oxidation of the biosludge and a means for guiding the resulting ozonized biosludge into the second aeration tank may be employed irrespective of the structure of the unit. For contacting ozone with the biosludge, various techniques may be employed, for example, blowing ozone into an ozonization vessel supplied with the biosludge suspension, mechanically mixing ozone with the biosludge suspension, contacting ozone with the biosludge suspension in a packed column and so on. In the case where the sludge particles tend to settle in the ozonization vessel or where the amount of the sludge particles settling down in the vessel surpass the amount of the sludge particles floating up in the vessel, it is preferable to effect the contact of the biosludge suspension with ozone on the principle of parallel flow, whereby the ozone-contacting efficiency is increased. On the other hand, in case where the sludge particles tend to float up in the vessel or where the sludge particles floating up prevail over those settling down, the ozone-contacting should preferably be effected on the principle of counter flow, whereby the ozone-contacting efficiency is increased.

Upon blowing the ozone-containing gas into the ozonization vessel, foaming of the liquid phase may occur. In order to exclude any hindering effect due to such foaming, liquid spraying means for preventing the foaming may be installed within the ozonization vessel. For the liquid spraying means, it is convenient to provide the ozone treatment unit with a means for spraying the sludge suspension extracted from the ozonization vessel onto the liquid surface of the ozonization vessel.

The ozone treatment efficiency will further be increased by employing an ozonization vessel constructed in such a manner that it comprises a liquid contacting zone disposed in the lower part of the vessel, into which the ozone-containing gas is blown to effect the gas/liquid contact, and a foaming contacting zone disposed in the upper part of the vessel, in which the gas/liquid contact is effected between the ozone-containing gas and the thin liquid films of bubbles in the foaming layer. Here, the height of the liquid contacting zone may be in the range of 0.2–3 meters, preferably in the range of 0.5–1.5 meters. A height of the foaming contacting zone of at least 1 meter above the sludge suspension level of the liquid contacting zone may be sufficient, while it may preferably be in the range of 1–10 m and more preferably in the range of 2–5 m.

The foaming contacting zone may be furnished with a foaming layer supporting element, in order to enable it to maintain the foaming layer efficiently and, thus, to increase the ozone treatment efficiency, even in case where the maintenance of the foaming layer is not easy due to the large-size diameter of the ozonization vessel or where the foaming of the biosludge suspension is not easy due to the low concentration of the biosludge. Foaming layer supporting elements effective for maintaining the foaming layer may preferably be employed, such as a lattice screen or a honeycomb plate with partition frames.

The ozonization vessel may be provided, above the foaming contacting zone, with a means for spraying a liquid, such as industrial water, the final treated water, sludge suspension extracted from the ozonization vessel and mixture of this extract with the starting aqueous waste to be treated, onto the surface of the foaming layer, whereby it is able to suppress superfluous foaming and to maintain the desired thickness of the foaming layer. Here, it is preferable to use the sludge suspension extracted from the ozonization vessel or the mixture of this extract with the starting aqueous waste, since thereby no decrease in the biosludge concentration in the reaction mixture of the ozonization vessel and no stuffing of the spray nozzles etc. occurs.

The ozonization vessel can be constructed with lower strength than the vessels filled with the liquid to be treated, since the foaming contacting zone thereof is filled up only with a bubble layer, so that it requires lower investment cost.

The efficiency of the oxidative decomposition will be increased when the ozone treatment is effected in an acid range at pH 5 or lower. Here, the pH control may be attained preferably by adding an inorganic acid, such as sulfuric acid, hydrochloric acid or nitric acid, as a pH controlling agent, to the extracted biosludge or by acidogenesis of the extracted biosludge or, further, by a combination of them. When using a pH controlling agent, it is preferable to adjust the pH value at 3–4. When acidogenesis is employed, a pH of 4–5 may preferably be adjusted. The ozone treatment may be realized by bringing the extracted biosludge or the treated liquor from the acidogenesis, as such or, if necessary, after having been concentrated on, for example, a centrifuge or the like, and been adjusted to a pH of 5 or lower, into contact with ozone.

Any ozone-containing gas, such as ozone gas itself, ozone-containing air, ozonized air, may be used as the ozone source. The ozone supply rate, or ozone dose, may be in the range from 0.002 to 0.05 gram of $O_3$ per gram of VSS (volatile suspended solids), preferably from 0.005 to 0.03 g-$O_3$/g-VSS.

Now, the description is directed to the acid treatment unit as the modification unit. The acid treatment unit is an apparatus for modifying the extracted biosludge by adding a mineral acid, such as hydrochloric acid, sulfuric acid or the like, to the biosludge and retaining it in the apparatus under an acidic condition of a pH of 2.5 or below, preferably 1–2, for a predetermined period of time. For the acid treatment, any apparatus having a modification vessel for modifying the extracted biosludge and a means for guiding the acid-treated sludge into the second aeration tank may be employed irrespective of the construction of the apparatus. The retention time of the biosludge in the modification vessel may be settled within the range of, for example, 5–24 hours. Here, it is desirable to heat the biosludge at a temperature of, for example, 50°–100° C., since the modification may be accelerated thereby. By such an acid treatment, the biosludge is modified to be easily biodegradable.

The alkali treatment unit as the modification unit serves for modifying the extracted biosludge by adding an alkali, such as sodium hydroxide, potassium hydroxide or the like, in an mount of 0.1–1% by weight to the biosludge and retaining the resulting mixture in the unit for a definite period of time. For the alkali treatment, any apparatus having a vessel for modifying the extracted biosludge and a means for guiding the alkali-treated sludge into the second aeration tank may be employed irrespective of the structure of the apparatus. The retention time of the biosludge in the modification vessel may be settled within the range of, for example, 0.5–2 hours. Here, it is desirable to heat the biosludge at a temperature of, for example, 50°–100° C., since the modification may be accelerated thereby. Such an alkali treatment modifies the biosludge to be easily biodegradable.

The heat treatment unit as the modification unit is designed to modify the extracted biosludge by holding it at a temperature of, for example, 70°–100° C., for a predetermined period of time of, for example, 2–3 hours. For the heat treatment, any apparatus of any construction can be employed, so long as it has a modification vessel for modifying the extracted biosludge and a means for guiding the heat-treated biosludge into the second aeration tank, wherein it is preferable to use such an apparatus in combination with the acid treament unit or the alkali treatment unit. By the heat treatment, the biosludge is modified to be easily biodegradable.

The second aeration tank of the apparatus according to the present invention serves for receiving the modified biosludge from the modification treatment unit and another part of the separated sludge (return sludge) delivered from the solid/liquid separation unit and is equipped with means for mixing them together with the biosludge retained in the tank and aerating the resulting mixture as well as for returning the resulting aerated biosludge to the first aeration tank. Here, the first and the second aeration tanks may be installed either as two separate tanks independent from each other or as one composite unit separated by a partition from each other. The volumetric ratio of the first aeration tank to the second aeration tank is desirably be in the range of 9:1–4:6, preferably in the range of 8:2–5:5.

In operation, the extracted biosludge in the modification treatment unit is modified by one or more modification treatment comprising the ozone treatment, acid treatment, alkali treatment and heat treatment, whereby it is converted into easily biodegradable organic substances. The resulting modified sludge is guided together with another unmodified part of the separated sludge into the second aeration tank as the return sludge, where they are mixed together with the biosludge retained in the second aeration tank and the resulting mixture is aerated therein. The aerobic bacteria in the biosludge will then multiply promptly due to the aeration at a high biosludge concentration, whereby the number of living cells of the bacteria increases rapidly.

In the first aeration tank, the organic matter in the raw aqueous waste and the easily biodegradable product in the modified sludge are aerobically biolysed by mixing the modified sludge with the biosludge containing an increased number of living bacterial cells in the second aeration tank and aerating the mixture. In either of the first and the second aeration tanks, the organic substances are biolysed with simultaneous multiplication of the aerobic bacteria, wherein the first aeration tank serves mainly for the biolysis of the organic matter and the second aeration tank serves mainly for a vivid multiplication of the aerobic bacteria.

In the apparatus according to the present invention, the SRT' (SRT of living bacteria) is longer when compared with conventional apparatus for a given total effective volume, since two aeration tanks are employed in the apparatus of the present invention. For this reason, a longer time can be alloted for the biodegradation of organic matter for the apparatus of the present invention than conventional apparatus. As a result, a stable treated water quality can be attained with an improvement in the sedimentation performance of the sludge. The effect of increase of the SRT' in the case where a prior art apparatus operated at a low MLSS concentration is changed to an inventive apparatus is greater than the case where the prior art apparatus operated at a high MLSS concentration is changed to the inventive apparatus.

As described above, use of the apparatus for aerobic biological treatment according to the present invention reduces the amount of excess sludge, installation site area and investment costs while at the same time utilizes small sized apparatus and attains a stable treated water quality and an improved sedimentation performance. This result is possible because the raw aqueous organic waste is mixed with a biosludge and the resulting mixture is aerated in a first aeration tank, a partly extracted biosludge is modified in a modification treatment unit, the modified biosludge is aerated together with a return sludge in a second aeration tank, and the resulting aerated sludge is returned to the first aeration tank.

PREFERRED EMBODIMENT OF THE INVENTION

FIG. 1 shows a flow diagram for an embodiment of the apparatus according to the present invention employing an ozone treatment unit as the modification treatment unit. In FIG. 1, numeral 1 represents the aerobic biological treatment system composed of an aeration tank 11 and a solid/liquid separation unit 12. The aeration tank 11 is partitioned internally with a partition plate 13 and is subdivided into a first aeration tank 11a and a second aeration tank 11b. The first and the second aeration tanks 11a and 11b are connected by a flow path 14, so that the aeration tank is constructed so as to permit the mixed liquor in the second aeration tank 11b to flow into the first aeration tank 11a via the flow path 14. Over the bottom of the aeration tanks 11a, 11b, air distributors 15a, 15b are disposed respectively, to each of which is connected an air supply line 16a or 16b respectively. The first aeration tank 11a is connected with an aqueous waste supply line 17 and with a connection line 18 communicating to the solid/liquid separation unit 12. The solid/liquid separation unit 12 is connected with a treated liquid line 21 and a separated sludge delivery line 22. From the separated sludge delivery line 22, a sludge return line 24 having a pump 23 branches off to the second aeration tank 11b.

The modification treatment system 2 functions to modify biosludge by the ozone treatment so as to render it easily biodegradable and has an ozonization vessel 31, which is connected, at its upper portion, with a sludge extraction line 32 branched from the separated sludge delivery line 22 and a spent ozone discharge line 33 and, at its lower portion, with an ozone supply line 34 and an oxonized sludge delivery line 35. The ozonized sludge delivery line 35 extends from the ozonization vessel 31 to the second aeration tank 11b. The sludge extraction line 32 is provided with a pump 36. 37 is an excess sludge delivery line.

Figure 2:
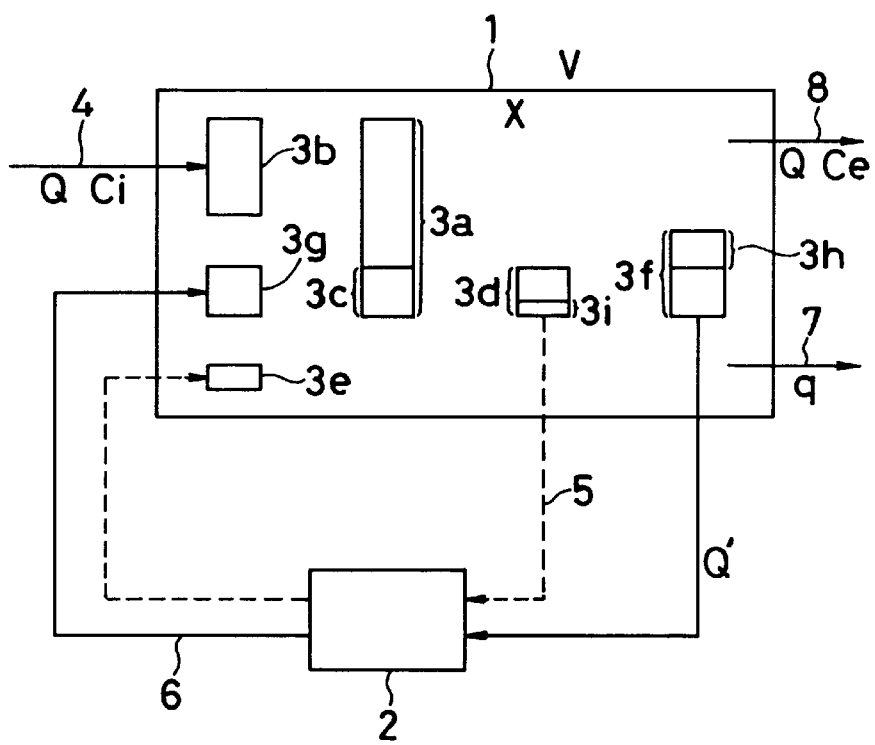
FIG. 2 is a schematic flow diagram for explaining the principle of the apparatus according to the present invention.

For realizing the aerobic biotreatment of an aqueous organic waste using the apparatus as shown in FIG. 2, the aqueous waste to be treated is first supplied to the first aeration tank 11a via the aqueous waste supply line 17 and is mixed with the biosludge charged preliminarily therein, while supplying air thereto via the first air supply line 16a through the first air distributor 15a, in order to cause an aerobic biotreatment. Here, the biodegradation of organic matter by a biooxidation reaction prevails with a multiplication of the biosludge.

A part of the mixed liquor in the first aeration tank is guided through the connection line 18 into the solid/liquid separation unit 12 where it is subjected to a solid/liquid separation by sedimentation into the treated liquid and the separated sludge. The separated liquid phase is exhausted out of the system as the treated liquid via the treated liquid line 21. The separated sludge is discharged out through the separated sludge delivery line 22, while a part thereof is guided into the second aeration tank 11b as the return sludge by the operation of the pump 23 via the sludge return line 24.

A part of the separated sludge is guided by the pump 36 via the sludge extraction line 32 into the ozonization vessel 31 as extracted sludge. Ozone is supplied hereto through the ozone supply line 34 to bring the extracted sludge into contact with ozone to modify the biosludge by ozonization so as to render it easily biodegradable. The living bactria in the extracted biosludge are almost destroyed thereby and the biosludge is decomposed into BOD components. The spent ozone is discharged out via the spent ozone discharge line 33. The ozonized sludge is recirculated to the second aeration tank 11b through the ozonized sludge delivery line 35. If excess sludge occurs, it is discharged out via the excess sludge delivery line 37.

In the second aeration tank 11b, a part of the separated sludge (return sludge) and the ozonized sludge are mixed together with the biosludge present in the tank while supplying air via the second air supply line 16b through the second air distributor 15b to effect an aerobic biological treatment. Here, a rapid multiplication of the biosludge prevails, though some biodegradations by biooxidation reaction may also occur. The mixed liquor in the second aeration tank 11b is returned to the first aeration tank 11a via the flow path 14.

Thus, the apparatus according to the present invention is constructed in such a manner that the aeration vessel 11 is subdivided into the first and the second aeration tanks 11a, 11b and the ozonized sludge from the ozone treatment unit 2 is subjected to an aerobic biotreatment together with the return sludge from the sludge return line 24, whereupon the resulting mixed liquor of this aerobic biotreatment is guided to the first aeration tank 11a and is again subjected to a further aerobic biotreatment therein by mixing it with the aqueous waste to be treated. Therefore, the amount of biosludge retained in the total aeration vessel 11 is increased as compared with the case where the aerobic biotreatment is performed in a single aeration tank. Consequently, the SRT of living bacteria (SRT') is extended, whereby the treated water quality is stabilized at a high value and the sedimenting property of the sludge in the solid/liquid separation unit 12 is improved.

While the aeration tanks 11a and 11b of the apparatus of FIG. 1 are built up by subdividing one vessel into two sections by a partition plate 13, the first and the second aeration tanks 11a and 11b can be made of each an independent tank. Here, the SRT' in the second aeration tank can be held higher even if the capacity of this tank is smaller, so that the total space of the aeration installation can be reduced as compared with the case where a comparable SRT' should be attained with a single aeration tank and, thus, advantages are attained in the investment cost and in the installation space. In addition, it is also possible to perform the ozone treatment for the biosludge in the first aeration tank 11a, instead of performing the ozone treatment for the extracted sludge from the solid/liquid separation unit 12 as in the above embodiment.

Now, the principle of the reduction of the amount of excess sludge according to the present invention is explained.

FIG. 2 is a schematic diagram for explaining the principle of reduction of the volume of excess sludge according to the present invention. In FIG. 2, numeral 1 represents the aerobic biotreatment system and 2 the modification treatment system. The aerobic biotreatment system 1 serves for performing an aerobic biodegradation of the organic matter in the aqueous organic waste by contacting it with biosludge, as in the activated sludge treatment. In FIG. 2, entire treating system is shown, in which the first and the second aeration tanks are disposed separately from the solid/liquid separation unit.

Within the aerobic biotreatment system 1 in FIG. 2, a definite amount of biosludge 3a is retained in order to effect the aerobic biotreatment. When starting the aerobic biotreatment by supplying the aerobic biotreatment system 1 with an aqueous organic waste to be treated 4, the BOD components contained in the aqueous organic waste 4 are anabolized in the living bacteria in the biosludge 3a, causing multiplication of the bacteria which brings about a newly formed biosludge 3b. On the other hand, the living bacteria of the biosludge 3a within the system suffer from autolysis, whereby an autolysis portion 3c disappears. Thus, in a steady state, the difference between the newly formed biosludge 3b and the autolysis portion 3c remains as the multiplied biosludge 3d.

In FIG. 2, the dotted line 5 indicates the case where the multiplied biosludge 3d is treated as excess sludge in the modification system 2. When the multiplied biosludge 3d is subjected to the modification treatment and the resulting modified product is returned to the aerobic biotreatment system 1, the BOD components formed by the modification treatment will be anabolized by the biosludge and another amount of biosludge 3e is formed as the substantial increment of the biosludge, which must be exhausted out of the system as excess sludge.

On the other hand, when the biosludge is extracted from the aerobic biotreatment system 1 in an amount 3f greater than the multiplied biosludge 3d to subject to the modification treatment in the modification treatment system 2 so as to convert it into BOD components to thereby form a modified biosludge 6 which is returned to the aerobic biotreatment system 1, a further multiplied portion 3g of biosludge is formed. The difference between the extracted biosludge 3f and the further formed portion 3g corresponds to the mineralized portion 3h.

When the extracted biosludge in an amount 3f greater than the multiplied biosludge 3d is subjected to the modification treatment to convert it into BOD components, the rate of reduction of the amount of excess sludge becomes higher than the case where only the multiplied biosludge 3d is modified, since thereby the proportion of the mineralized portion 3h increases. If the amount of extracted biosludge 3f is settled so as to equalize the amount of multiplied biosludge 3d with that of the mineralized portion 3h, the amount of excess sludge becomes substantially zero. If the amount of the multiplied biosludge 3d is greater than that of the mineralized portion 3h, the difference therebetween corresponds to the substantial increment 3i which is exhausted out of the system as excess sludge. 8 represents the treated liquid from the aerobic biotreatment system 1.

Expressing the volume of the aeration tank in the above-mentioned aerobic biotreatment system 1 by V, the concentration of the biosludge therein by X, the sludge yield by Y, the flow rate of the aqueous organic waste (throughput) by Q, concentration of the organic matter in the aqueous organic waste by Ci, the concentration of the organic matter in the treated liquid by Ce, the concentration corresponding to the biologically treated amount of the organic matter by (Ci−Ce), the coefficient of autolysis of the biosludge by Kd, the rate of exhaustion of excess sludge by q, the extracted amount of biosludge to the modification treatment unit by Q' and the proprportion of re-conversion of the modified sludge into the biosludge by k, the mass balance is represented by the following equation (1):

$$V \cdot dX/dt = YQ(Ci-Ce) - VK \cdot dX - qX - Q'X + kQ'X \quad (1)$$

In equation (1), V·dX/dt is the rate of change of the biosludge 3a in the aerobic biotreatment system 1, YQ(Ci−Ce) is the amount of the newly formed biosludge 3b, VK·dX is the amount of the autolysis portion 3c, qX is the amount of excess sludge 7, Q'X is the amount of the extracted biosludge 3f and kQ'X is the amount of re-conversion 3g from the modified biosludge.

Assuming Q(Ci−Ce)/V=LV (load of the aeration tank), q/V=1/SRT (ratio of excess sludge to retention time), Q'/V=θ (recirculation ratio of the recirculation of biosludge to the modification treatment system) and (1−k)=δ (mineralization rate), the equation (1) is simplified in a steady state by the following equation (2):

$$YLV/X = Kd + (1/SRT) + \delta\theta \quad (2)$$

In a usual aerobic biotreatment system where modification treatment system 2 is absent, the amount of excess sludge for a constant biosludge load is determined by the second term (X/SRT), since the third term (δ θ) is zero. In contrast, in a treatment system combined with a modification treatment system, the amount of the excess sludge can be reduced according to the value of the third term. Here, it is possible under a condition in which the value of the third term is comparable to the value of the second term, the biosludge load can be settled at an ordinary value even though no excess sludge is exhausted out of the system (1/SRT=0).

Explaining the case where the modification treatment consists in an ozone treatment, it is to be noted that the third term of the equation (2) includes two parameters, mineralization rate δ and recirculation ratio θ, of which the value δ will settle at a steady value at around 0.5 when the ozone dose relative to the biosludge is 0.01 g $O_3$/g-VSS or higher and, hence, the apparent reduction in the excess sludge amount is proportional to the recirculation ratio θ in this region.

On the other hand, the recirculation ratio θ does not have any influence on the activity of the biosludge up to about 0.5 $day^{-1}$. This means that the biological activity of the biosludge in the aerobic biotreatment system 1 can be maintained, even if ½ or less per day of the biosludge retained in the aerobic biotreatment system 1 is recirculated as the extracted biosludge 3f to the ozonization system.

The upper limit of the recirculation ratio is therefore 0.5 $day^{-1}$. In case θ=0, the system operates on the basis of complete oxidation, wherein however, the biosludge load should be low and the reduction of excess sludge is scarce. In case the amount of the extracted biosludge 3f corresponds to the amount of multiplication of the biosludge 3d, the rate of reduction of the excess sludge is similar to that of concentional method. In a usual aerobic biological treatment, the SRT may amount to 10 days and the rate of extraction of the biosludge may be 0.1 $day^-$. When the extracted biosludge 3f in an amount greater than that of the multiplied biosludge 3d is recirculated inaccordance with the present invention, the lower limit of the recirculation ratio θ may be in excess of 0.3 $day^{-1}$, wherein the θ value may preferably be at least 0.2 $day^{-1}$ and, if this value is settled at 0.3 day$^{-1}$, a complete elimination of occurrence of excess sludge, namely, 100% reduction of excess sludge can be attained.

Below, the present invention is further described by way of Example.

EXAMPLE 1, COMPARATIVE EXAMPLE 1

An aerobic biological treatment of the integrated sewage water in an automobile factory was carried out in the following manner: In the first half of the experimental run over a period of 25 days, the biological treatment was conducted on the apparatus as shown in FIG. 4 (Comparative Example 1) and, in the second half over a period of 35 days, the biological treatment was carried out by exchanging the apparatus for that shown in FIG. 1 (Example 1). The experimental conditions and the sewage water quality were as given in Table 1 below. The change in the SVI during the experiment was as given in FIG. 3.

TABLE 1

|  | Comp. Exam. 1 | Example 1 |
|---|---|---|
| Original sewage water: |  |  |
| BOD (mg/l) | 80 | " |
| COD (mg/l) | 45 | " |
| Temoerature (°C.) | 13 | " |
| Supply rate (m$^3$/day) | 12 | " |
| Sludge return rate (%) | 40 | " |
| SS in return sludge (mg/l) | 12,000 | " |
| Total volume of the aeration tanks (m$^3$) | 1 | " |
| 1st aer. tank vol. (m$^3$) | — | 0.67 |
| 2nd aer. tank vol. (m$^3$) | — | 0.33 |
| MLSS conc. in aeration tanks (mg/l) | 3,500 | — |
| MLSS conc. in 1st aer. tank (mg/l) | — | 3,500 |
| MLSS conc. in 2nd aer. tank (mg/l) | — | 12,000 |
| Ozonization rate (kg-Ds/day) | 1 | " |
| Ozone dose (kg-O$_3$/kg-SS) | 0.05 | " |
| Treated water quality: |  |  |
| SS (mg/l) | 19*[1] | 11*[2] |
| COD$_{Mn}$ (mg/l) | 17*[1] | 9*[2] |

Figure 3:
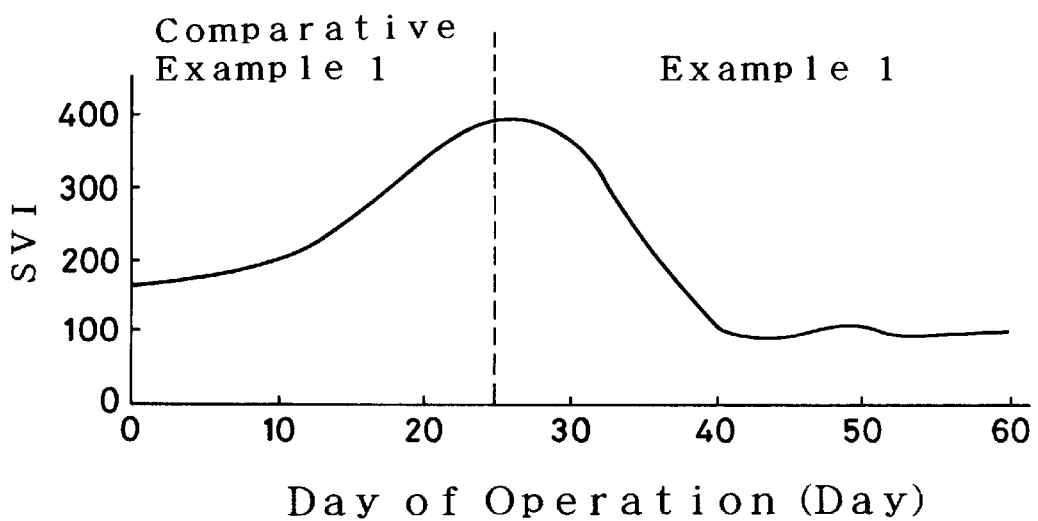
FIG. 3 is a graph showing the SVI fluctuation in Comparative Example 1 and in Example 1.
Figure 4:
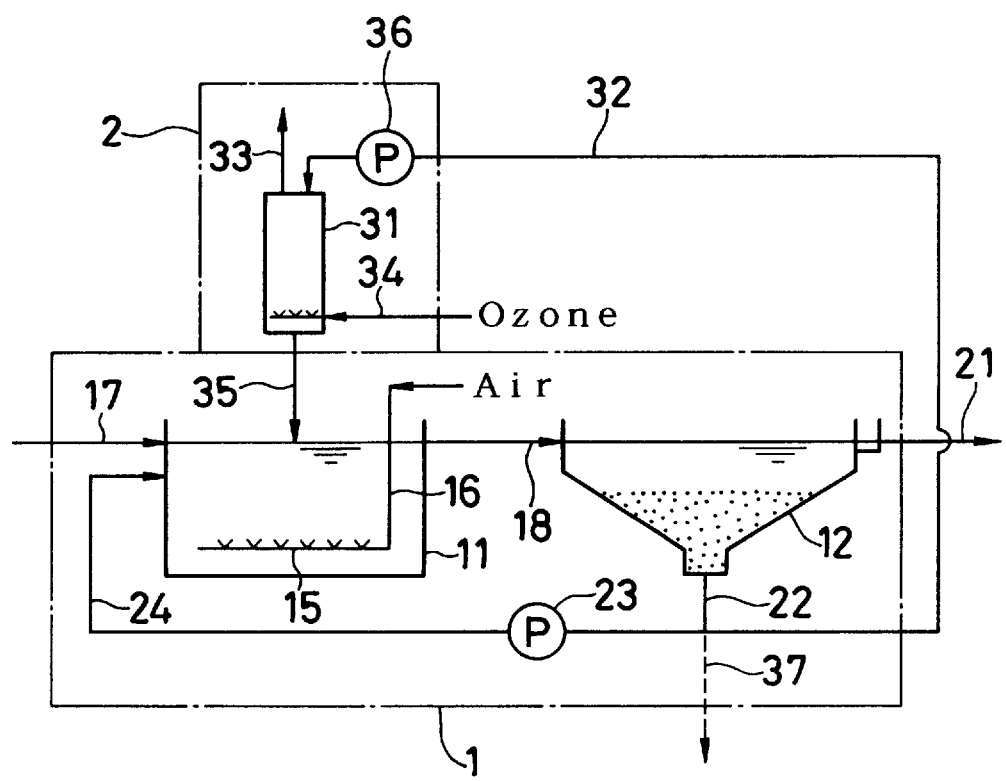
FIG. 4 is a schematic flow diagram for a conventional apparatus.

Note:
*[1] Average value during 10th to 25th day
*[2] Average value during 40th to 60th day As seen in FIG. 3, The SVI value of the biosludge charged upon the starting of the experiment (the day 0) was about 160, which was increased in the course of the experimental run and reached a value of about 400 on the day 25 (Comparative Example 1). After the change-over to the apparatus of FIG. 1, the SVI value was decreased rapidly and, on and after the 15th day from the change-over to the apparatus according to the present invention, the biosludge was present in a better floc of an SVI value around 100 (Example 1).

Further, it is seen from the results give in Table 1 that the quality of the treated water was inferior in Comparative Example 1, whereas a stable better quality of the treated water was obtained in Example 1.

Calculating the SRT (SRT of living bacteria) in the above Example 1 and Comparative Example 1 based on the equation (a) given previously, the following values are obtained:

| SRT' for Comparative Example 1 | 3.5 (day) |
|---|---|
| SRT' for Example 1 | 6.3 (day) |

As is seen from the above, the SRT' value for Example 1 is longer than that for Comparative Example 1.

We claim:

1. An apparatus for aerobic biological treatment of an aqueous organic waste comprising:

a first aeration tank comprising means for mixing the aqueous organic waste with an activated sludge to form a resulting mixture and aerating the resulting mixture to subject organic matter contained therein to biodegradation through biological oxidation;

means for introducing the aerated resulting mixture into a solid/liquid separation unit;

a solid/liquid separation unit comprising means for separating the aerated resulting mixture into a liquid phase and separated sludge;

means for introducing a part of the separated sludge into a modification unit;

a modification treatment unit for treating the part of the separated sludge to render biosludge contained therein biodegradable by destroying living bacteria to convert it into BOD components;

means for introducing the treated part of the separated sludge into a second aeration tank;

means for introducing another part of the separated sludge from the solid/liquid separation unit into the second aeration tank;

a second aeration tank comprising means for mixing and aerating the treated part of the separated sludge and the other part of the separated sludge to form a resultant sludge mixture; and means for introducing the resultant sludge mixture into the first aeration tank.

2. An apparatus according to claim 1, wherein the modification treatment unit is selected from the group consisting of an ozone treatment unit, an acid treatment unit, an alkali treatment unit, a heat treatment unit, and combinations thereof.

3. An apparatus according to claim 2, wherein the modification treatment unit is an ozone treatment unit.

4. An apparatus according to claim 2, wherein the modification treatment unit is an acid treatment unit.

5. An apparatus according to claim 4, wherein the acid treatment unit has means for maintaining acidic conditions of a pH of 2.5 or below.

6. An apparatus according to claim 2, wherein the modification treatment unit is an alkali treatment unit.

7. An apparatus according to claim 2, wherein the modification treatment unit is a heat treatment unit.

8. An apparatus according to claim 1, wherein the modification treatment unit has means to modify a greater amount of sludge than the amount multiplied in the first and the second aeration tanks.

9. An apparatus according to claim 1, wherein the volume ratio of the first to second aeration tank is in the range of 9:1–6:4.

10. An apparatus according to claim 1, wherein the first and the second aeration tanks are formed by partitioning a vessel with a partition having a flow path therein.

11. An apparatus for aerobic biological treatment of an aqueous organic waste comprising:

a first aeration tank comprising means for mixing the aqueous organic waste with an activated sludge to form a resulting mixture and aerating the resulting mixture to subject organic matter contained therein to biodegradation through biological oxidation;

means for introducing the aerated resulting mixture into a solid/liquid separation unit;

a solid/liquid separation unit comprising means for separating the aerated resulting mixture into a liquid phase and separated sludge;

means for introducing separated sludge into a second aeration tank;

a second aeration tank comprising means for mixing and aerating the separated sludge to form a resultant sludge mixture;

means for introducing the resultant sludge mixture into the first aeration tank; and means for treating biosludge in the first aeration tank to render it biodegradable by destroying living bacteria contained therein and form BOD components.

12. An apparatus according to claim 11, wherein said means for treating biosludge comprises a means for introducing ozone in to the first aeration tank.

* * * * *